US012632393B2

(12) United States Patent
Han et al.

(10) Patent No.: US 12,632,393 B2
(45) Date of Patent: May 19, 2026

(54) COMPUTER DEVICE AND MEMORY REGISTRATION METHOD

(71) Applicant: Huawei Technologies Co., Ltd., Shenzhen (CN)

(72) Inventors: Zhaojiao Han, Shenzhen (CN); Lisi Chen, Shenzhen (CN); Gang Zhang, Shenzhen (CN); Xinteng Zhao, Shenzhen (CN); Fanlu Jiang, Chengdu (CN)

(73) Assignee: Huawei Technologies Co., Ltd., Shenzen (CN)

( * ) Notice: Subject to any disclaimer, the term of this patent is extended or adjusted under 35 U.S.C. 154(b) by 63 days.

(21) Appl. No.: 18/502,234

(22) Filed: Nov. 6, 2023

(65) Prior Publication Data

US 2024/0070087 A1      Feb. 29, 2024

Related U.S. Application Data

(63) Continuation of application No. PCT/CN2022/077441, filed on Feb. 23, 2022.

(30) Foreign Application Priority Data

May 7, 2021      (CN) .......................... 202110496244.3

(51) Int. Cl.
*G06F 12/02*          (2006.01)
*G06F 12/1081*        (2016.01)
*G06F 12/14*          (2006.01)

(52) U.S. Cl.
CPC ...... *G06F 12/1081* (2013.01); *G06F 12/0292* (2013.01); *G06F 12/1441* (2013.01)

(58) Field of Classification Search
CPC ............. G06F 12/1081; G06F 12/0292; G06F 12/1441
See application file for complete search history.

(56) References Cited

U.S. PATENT DOCUMENTS

2003/0093625 A1* 5/2003 Beukema ............ G06F 12/1475
                                                711/147
2003/0163647 A1* 8/2003 Cameron ............ G06F 12/1045
                                                711/203

(Continued)

FOREIGN PATENT DOCUMENTS

CN          111221758 A      6/2020

OTHER PUBLICATIONS

NVM ExpressTM over Fabrics Revision 1.0a. Jul. 17, 2018, total 51 pages.

(Continued)

*Primary Examiner* — Eric T Loonan
(74) *Attorney, Agent, or Firm* — Slater Matsil, LLP

(57)          ABSTRACT

A computer device includes a processor; a memory connected to the processor, where the memory includes a first memory region; and a plurality of network adapters connected to the processor. The processor is configured to: when registering the first memory region with the plurality of network adapters, record a first memory address in a first memory address translation table (MTT) into a memory protection table (MPT) of each network adapter in the plurality of network adapters, so that each of the network adapters is capable of accessing the first memory region by using the first memory address translation table. The first memory address translation table is used to indicate a correspondence between a virtual address of the first memory region and a physical address of the first memory region.

19 Claims, 10 Drawing Sheets

(56)        References Cited

U.S. PATENT DOCUMENTS

2006/0004941 A1 *  1/2006  Shah ................... G06F 12/1027
                                                            711/3
2006/0195626 A1 *  8/2006  Arndt ................. G06F 12/0653
                                                            710/10
2013/0067193 A1 *  3/2013  Kagan ................ G06F 12/1081
                                                            711/206

OTHER PUBLICATIONS

InfiniBand Architecture Specification vol. 1 Release 1.4. Apr. 7,
2020. total 1981 pages.

* cited by examiner

COMPUTER DEVICE AND MEMORY REGISTRATION METHOD

CROSS-REFERENCE TO RELATED APPLICATIONS

This application is a continuation of International Application No. PCT/CN2022/077441, filed on Feb. 23, 2022, which claims priority to Chinese Patent Application No. 202110496244.3, filed on May 7, 2021. The disclosures of the aforementioned applications are hereby incorporated by reference in their entireties.

TECHNICAL FIELD

This disclosure relates to the field of data storage technologies, and specifically, to a computer device and a memory registration method.

BACKGROUND

A storage array system may provide a data storage service for a host client by connecting to the host client through a network adapter. To enable the host client to access data of the storage array system through the network adapter, a memory space that stores data needs to be first registered (register) with the network adapter in a form of a memory region (MR), and permission to access the MR is granted to the network adapter.

Generally, an access request received by the network adapter carries a virtual address of the memory space, and the virtual address is used to indicate a memory space requested by the access request. The network adapter uses a physical address for addressing. Therefore, when the MR is registered, a memory translation table (MTT) needs to be created for the network adapter, to record a correspondence between a physical address and a virtual address that are corresponding to the MR. In this way, the network adapter can determine a physical address based on the virtual address in the access request, to access a corresponding MR through the physical address.

The host client may access a same MR through a plurality of network adapters. In other words, one MR needs to be registered with a plurality of network adapters, so that the plurality of network adapters all can access the MR. An MR that can be accessed by a plurality of network adapters is referred to as a shared MR of the plurality of network adapters. Currently, when the MR is registered with a plurality of network adapters, MTTs are created for different network adapters. In other words, a plurality of MTT's need to be created. As each of the plurality of MTTs needs to occupy a memory space of the memory, the plurality of MTTs result in high storage resource overheads.

SUMMARY

According to a computer device and a memory registration method provided in embodiments of this disclosure, there is no need to create a plurality of MTTs for a shared MR. This saves storage resources.

According to a first aspect, an embodiment of this disclosure provides a computer device, including: a processor, a memory connected to the processor, where the memory includes a first memory region, and a plurality of network adapters connected to the processor. The processor is configured to: when registering the first memory region with the plurality of network adapters, record a first memory address in a first memory address translation table MTT into a memory protection table MPT of each network adapter in the plurality of network adapters, so that each of the network adapters is capable of accessing the first memory region by using the first memory address translation table. The first memory address translation table is used to indicate a correspondence between a virtual address of the first memory region and a physical address of the first memory region.

In other words, during registration of a shared MR of the plurality of network adapters, a memory address of an MTT may be recorded into the MPT of each network adapter in the plurality of network adapters, so that all the plurality of network adapters can access the shared MR by using the MTT, and there is no need to create and store a plurality of MTTs for the plurality of network adapters. This saves storage resources.

In a possible implementation, the plurality of network adapters include a first network adapter and a second network adapter. The processor is configured to: when registering the first memory region with the first network adapter, record the first memory address into a memory protection table of the first network adapter. The processor is configured to: when registering the first memory region with the second network adapter, record the first memory address into a memory protection table of the second network adapter.

In a possible implementation, the plurality of network adapters include a first network adapter. The processor is configured to register the first memory region with the first network adapter, and then register the first memory region with a network adapter other than the first network adapter in the plurality of network adapters. The processor is configured to create the first memory address translation table when registering the first memory region with the first network adapter.

In other words, during registration of the shared MR, the MTT may be created only based on the first network adapter with which the MR is registered. This saves computing resources.

In a possible implementation, the processor is configured to record the first memory address and a first identifier of the first memory region into the memory protection table of each network adapter in the plurality of network adapters, so that each of the network adapters is capable of reading the first memory address translation table by using the first identifier.

In other words, in this implementation, a correspondence between a memory address of the MTT and an identifier of the memory region may be recorded in the MPT of the network adapter, so that the network adapter can determine the memory address of the MIT based on the identifier of the memory region.

In a possible implementation, different network adapters in the plurality of network adapters share a first resource, the first resource includes at least one shared identifier, the shared identifier is used to represent a memory region registered with the plurality of network adapters, and the first identifier is determined from the first resource.

In other words, in this implementation, the plurality network adapters may share an identifier resource, so that there is no need to set a plurality of identifiers for the shared MR of different network adapters.

In a possible implementation, a second resource is further configured for a first network adapter in the plurality of network adapters, the second resource includes at least one independent identifier, and the independent identifier is used to represent a memory region registered with only the first network adapter.

In other words, in this implementation, different network adapters may have independent identifier resources, for separately registering an independent MR.

In a possible implementation, the processor is configured to increment a count of a preset counter by 1 each time the first memory address is recorded into a memory protection table of one network adapter in the plurality of network adapters. The processor is further configured to decrement the count of the counter by 1 each time the first memory address is deleted from a memory protection table of one network adapter in the plurality of network adapters. The processor is configured to delete the first memory address translation table when the count of the counter returns to 0.

In other words, in this implementation, a quantity of network adapters that use the MTT may be recorded by using the counter. When there is no network adapter using the MTT, the MTT may be deleted to save memory resources.

In a possible implementation, the plurality of network adapters are physical network adapters; the processor is further configured to run a virtual network adapter; and the processor is configured to: before registering the first memory region with the plurality of network adapters, create the first memory address translation table based on the virtual network adapter.

In other words, in this implementation, the MTT may be created through the virtual network adapter.

In a possible implementation, the processor is further configured to delete the first memory address translation table when the first memory address has been deleted from memory protection tables of all the plurality of network adapters.

In other words, in this implementation, when no physical network adapter uses the MTT, the MTT may be deleted.

According to a second aspect, an embodiment of this disclosure provides a memory registration method, applied to a computer device. The computer device includes a processor; a memory connected to the processor, where the memory includes a first memory region; and a plurality of network adapters connected to the processor. The method includes: recording, by the processor when registering the first memory region with the plurality of network adapters, a first memory address in a first memory address translation table MTT into a memory protection table MPT of each network adapter in the plurality of network adapters, so that each of the network adapters is capable of accessing the first memory region by using the first memory address translation table, where the first memory address translation table is used to indicate a correspondence between a virtual address of the first memory region and a physical address of the first memory region.

In a possible implementation, the plurality of network adapters include a first network adapter and a second network adapter; and the recording, by the processor, a first memory address in a first memory address translation table MTI into a memory protection table MPT of each network adapter in the plurality of network adapters includes: when registering the first memory region with the first network adapter, recording the first memory address into a memory protection table of the first network adapter; and when registering the first memory region with the second network adapter, recording the first memory address into a memory protection table of the second network adapter.

In a possible implementation, the plurality of network adapters include a first network adapter; and the registering, by the processor, the first memory region with the plurality of network adapters includes: registering, by the processor, the first memory region with the first network adapter, and then registering the first memory region with a network adapter other than the first network adapter in the plurality of network adapters. The processor creates the first memory address translation table when registering the first memory region with the first network adapter.

In a possible implementation, the method further includes: recording, by the processor, the first memory address and a first identifier of the first memory region into the memory protection table of each network adapter in the plurality of network adapters, so that each of the network adapters is capable of reading the first memory address translation table by using the first identifier.

In a possible implementation, different network adapters in the plurality of network adapters share a first resource, the first resource includes at least one shared identifier, the shared identifier is used to represent a memory region registered with the plurality of network adapters, and the first identifier is determined from the first resource.

In a possible implementation, a second resource is further configured for a first network adapter in the plurality of network adapters, the second resource includes at least one independent identifier, and the independent identifier is used to represent a memory region registered with only the first network adapter.

In a possible implementation, the method further includes: incrementing, by the processor, a count of a preset counter by 1 each time the first memory address is recorded into a memory protection table of one network adapter in the plurality of network adapters; decrementing, by the processor, the count of the counter by 1 each time the first memory address is deleted from a memory protection table of one network adapter in the plurality of network adapters; and deleting, by the processor, the first memory address translation table when the count of the counter returns to 0.

In a possible implementation, the plurality of network adapters are physical network adapters; the processor is further configured to run a virtual network adapter; and the method further includes: creating, by the processor before registering the first memory region with the plurality of network adapters, the first memory address translation table based on the virtual network adapter.

In a possible implementation, the method further includes: deleting, by the processor, the first memory address translation table when the first memory address has been deleted from memory protection tables of all the plurality of network adapters.

According to a third aspect, an embodiment of this disclosure provides a computer storage medium, where the computer storage medium includes computer instructions. When the computer instructions are run on a processor, the processor is enabled to perform the method provided in the second aspect.

According to a fourth aspect, an embodiment of this disclosure provides a computer program product. When program code included in the computer program product is executed by a processor, the method provided in the second aspect is implemented.

According to a fifth aspect, an embodiment of this disclosure provides a processor, configured to perform the method provided in the second aspect.

According to the computer device and the memory registration method provided in embodiments of this disclosure, a shared MR of a plurality of network adapters can be registered without creating and storing a plurality of MTTs. This reduces storage resource overheads.

DETAILED DESCRIPTION OF ILLUSTRATIVE EMBODIMENTS

The following describes technical solutions in embodiments of the present invention with reference to the accompanying drawings. It is clear that described embodiments are merely some rather than all of embodiments of this specification.

In descriptions of this specification, "an embodiment", "some embodiments", or the like indicates that one or more embodiments of this specification include a specific feature, structure, or characteristic described with reference to the embodiment/embodiments. Therefore, statements such as "in an embodiment", "in some embodiments", "in some other embodiments", and "in other embodiments" that appear at different places in this specification do not necessarily refer to a same embodiment, but mean "one or more but not all embodiments", unless otherwise specified in another way.

In the descriptions of this specification, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of embodiments of this specification, "a plurality of" means two or more than two.

In the descriptions of this specification, the terms "first" and "second" are merely intended for description, and shall not be understood as an indication or implication of relative importance or an implicit indication of a quantity of indicated technical features. Therefore, a feature limited by "first" or "second" may explicitly or implicitly include one or more of the features. The terms "include", "comprise", "have", and their variants all mean "include but not limited to", unless otherwise specified in another way.

Figure 1:
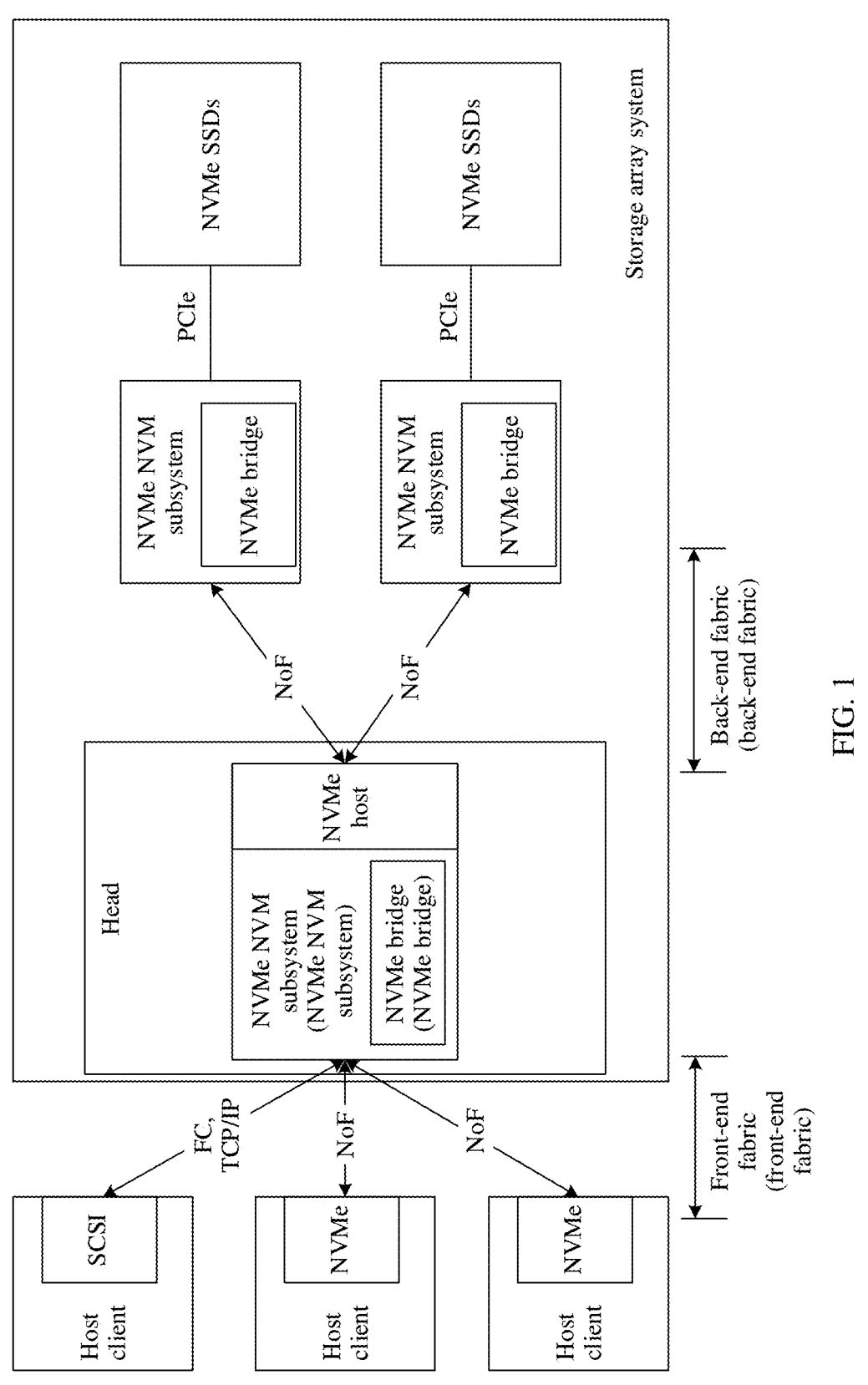
FIG. 1 is a schematic diagram of a network architecture.

Refer to FIG. 1. A host client is connected to a storage array through a front-end network, or specifically, a front-end fabric, so that the storage array can provide a data storage service for the host client. The host client may be referred to as a host for short. With the emergence of a solid-state drive (SSD) based on a non-volatile memory express (NVMe), a protocol for accessing the storage array for the host client phases out a small computer system interface (SCSI) in favor of an NVMe. Fibre channel (FC) and transmission control protocol/internet protocol (TCP/IP) networks are replaced by an NVMe over fabric (NoF) network as a corresponding front-end network.

Figure 2:
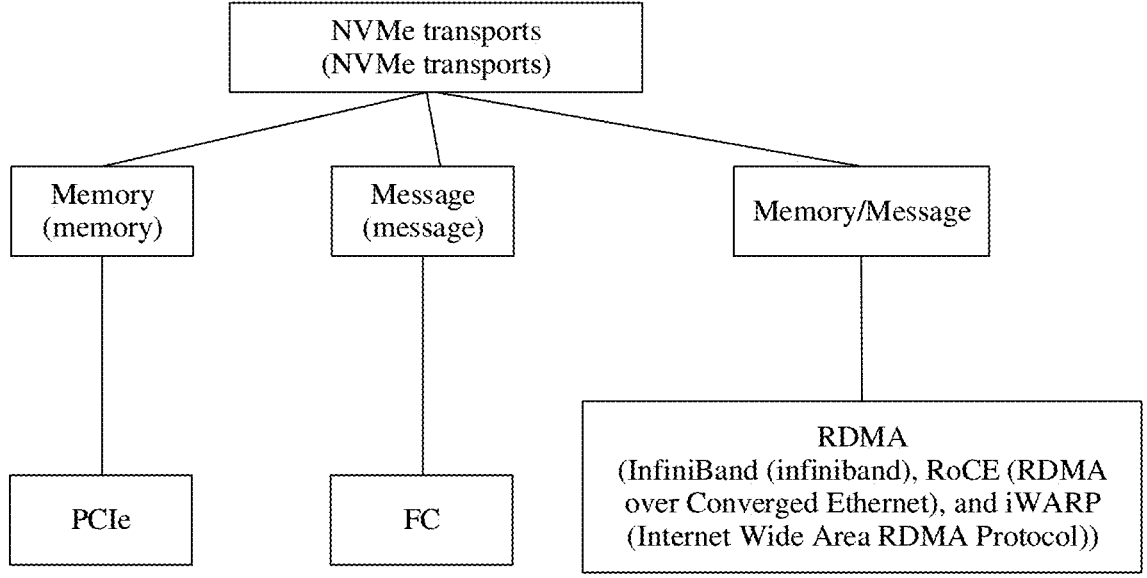
FIG. 2 is a schematic diagram of a network protocol supported by a NoF protocol.

Refer to FIG. 2. The NoF protocol supports two types of network protocols: memory and message. The NoF protocol may be supported by a peripheral component interconnect express (PCIe) network, an FC network, and a remote direct memory access (RDMA) network. An NVMe over RDMA network solution has been supported by many vendors.

Figure 3:
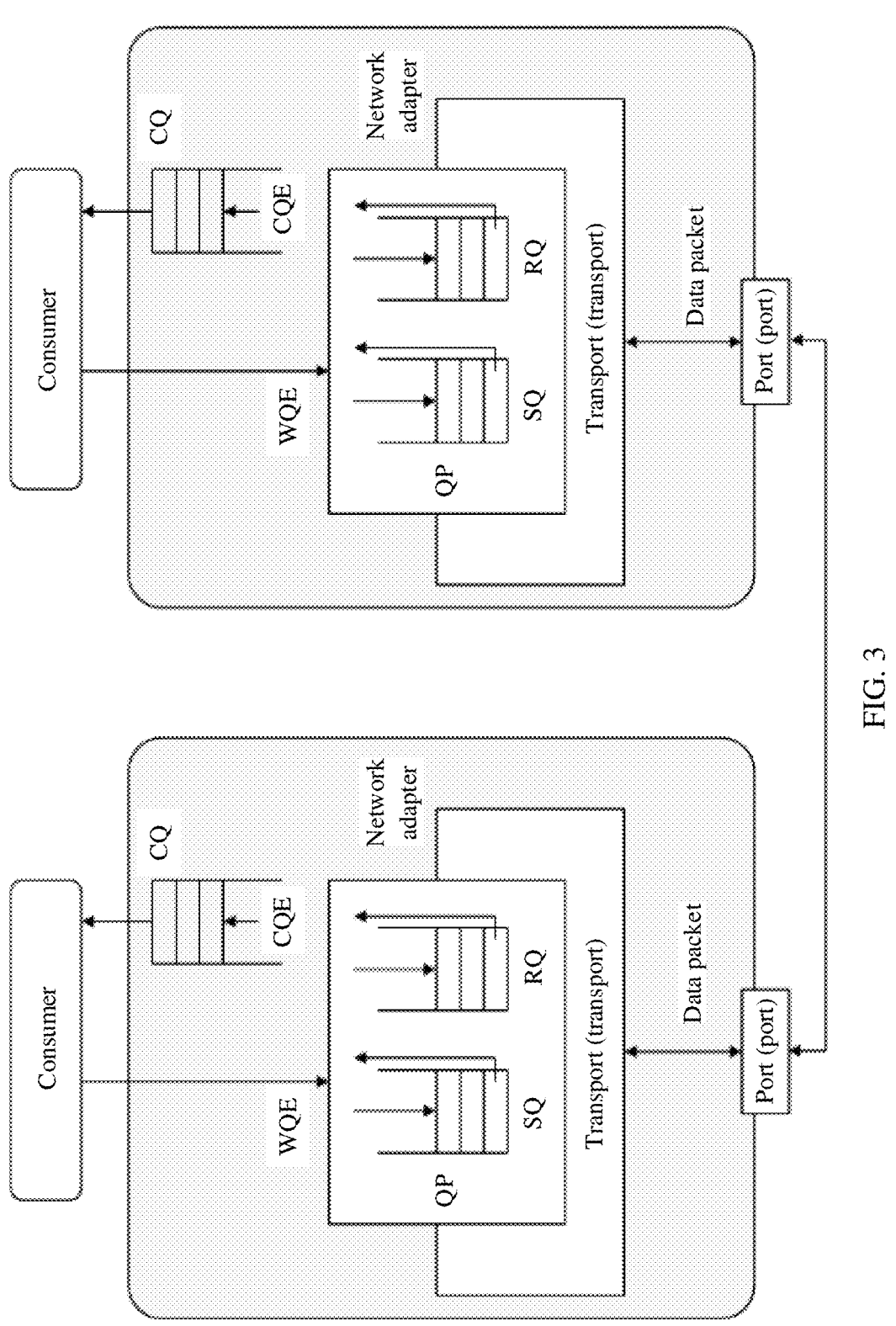
FIG. 3 is a schematic diagram of a working principle of a network adapter.

Refer to FIG. 3. The RDMA belongs to a transport layer network protocol, and uses a queue pair (QP) to send and receive consumer data. The consumer data may be data transmitted by a transport layer as instructed by an upper-layer protocol of the transport layer. Each QP includes one send queue (SQ) and one receive queue (RQ). The SQ is responsible for data sending, and the RQ is responsible for data reception. Each QP is associated with one completion queue (CQ). Each QP has its own connection context, and the connection context is used to maintain a connection status of the queue. The SQ, RQ, and CQ have respective queue context (queue context), and the queue context is used to maintain a usage status of the queue.

A consumer, namely, the upper-layer protocol of the transport layer, submits a work queue element (WQE) to the SQ when sending data. A network adapter converts user data pointed by the WQE into a packet and sends the packet to a network. After sending all data of one WQE, the network adapter reports one CQE to the CQ queue to notify the consumer that sending processing for a WQE submitted by the consumer has been done. All data required to be sent by one SQ WQE is a message. A data length of the message supports 0 bytes to (2G−1) bytes. A message needs to be divided into one or more data packets for sending, based on a division setting of a maximum transmission unit (MTU) in the network. The network adapter may be a host channel adapter (HCA).

When receiving data, the consumer submits a WQE to the RQ in advance. The network adapter writes packet data received from the network to a memory space to which the WQE in the RQ points. After completing reception of a message, the network adapter reports one CQE to the CQ to notify the consumer that one message has been received.

Consumer data may be stored in a memory of a head of the storage array. The head may also be referred to as a controller of the storage array. One or more storages in the controller may be used as the memory of the controller. When a local network adapter or a peer network adapter of the controller performs a read/write operation, a specified memory space in the memory needs to be first registered with the network adapter in a form of an MR (which may be a segment of continuous virtual address space), and read/write permission for the MR is granted to the network adapter. The network adapter may be an RDMA network interface card (RNIC), and the peer network adapter of the controller is a network adapter of a host client connected to the controller.

Figure 4:
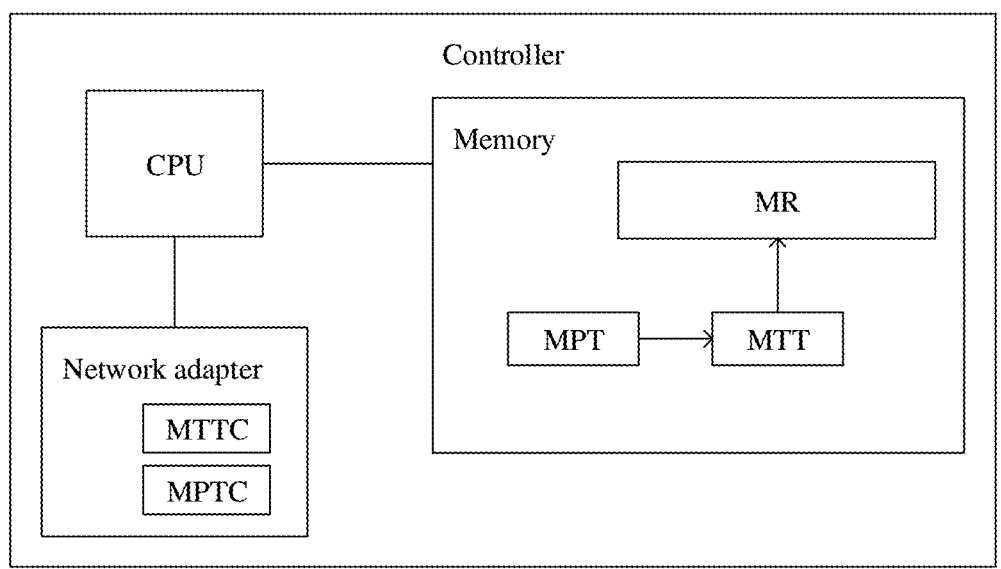
FIG. 4 is a schematic diagram of a structure of a controller.

Because the network adapter reads and writes the memory in a direct memory access (DMA) manner, only addressing based on a physical address is supported. Refer to FIG. 4. To enable the network adapter to access a corresponding MR, a central processing unit (CPU) of the controller needs to create a corresponding MTT when registering the MR with the network adapter, so as to provide translation from a memory virtual address to a physical address. In addition, the CPU generates a memory region key (MKEY) of the MR to identify the MR, and create a memory protection table (MPT) based on the MKEY, for the network adapter to determine access permission for the MR.

When the network adapter needs to access the MR, the network adapter may determine the MR based on a WQE or indication information carried in a message. The network adapter may search for the MPT based on the MKEY of the MR, obtain access permission of the network adapter for the MR, and then use an index to locate the MTT corresponding to the MR (the MPT includes a memory address of the MTT corresponding to the MR). When the network adapter has read/write permission for the MR, the network adapter initiates a DMA read/write operation on the MR. In addition, because the network adapter supports a large quantity of MRs, the MPT and the MTT are stored in a memory of the controller. However, to improve table lookup performance of the network adapter, a cache mechanism is generally used to cache some common MPTs and MTTs to the network adapter. The MPT cached in the network adapter may be referred to as a memory protection table cache (MPTC), and the MTT cached in the network adapter may be referred to as a memory translation table cache (MTTC).

Figure 5:
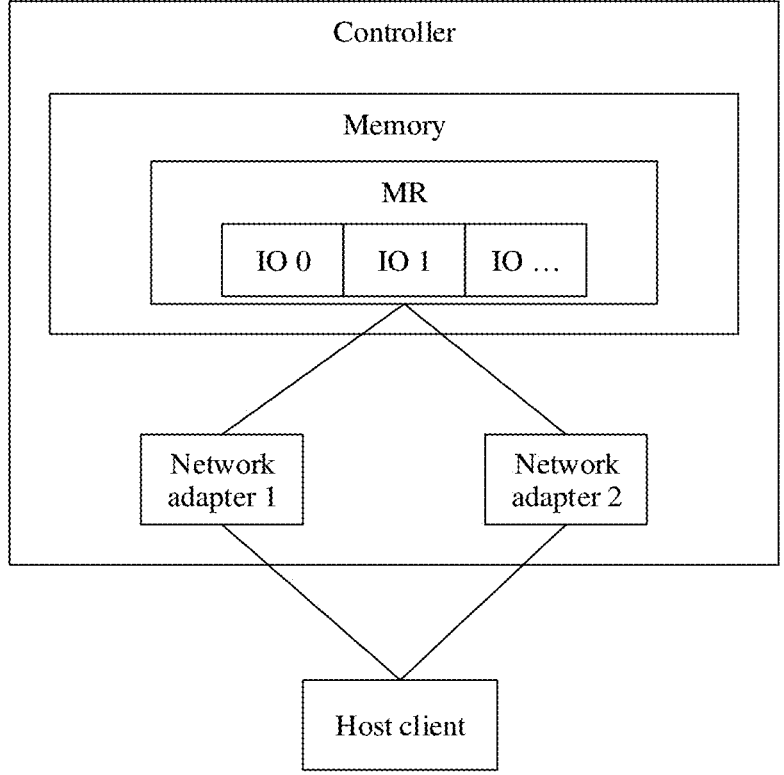
FIG. 5 is a schematic diagram of a structure of a controller.

Refer to FIG. 5. To increase a quantity of external interfaces on the controller of the storage array, a plurality of network adapters are used for expansion. In other words, the controller of the storage array may be connected to one or more host clients through plurality of network adapters. In addition, the host client based on a protocol such as NoF may support a multipath function. When the host client needs to access data stored in an MR, the host client needs to be capable of accessing the data in the MR from different network adapters. In other words, different network adapters need to be capable of accessing the same MR. An MR that can be accessed by a plurality of network adapters is referred to as a shared MR of the plurality of network adapters. As shown in FIG. 5, data stored in the MR may be I/O (input/output) data.

Figure 6:
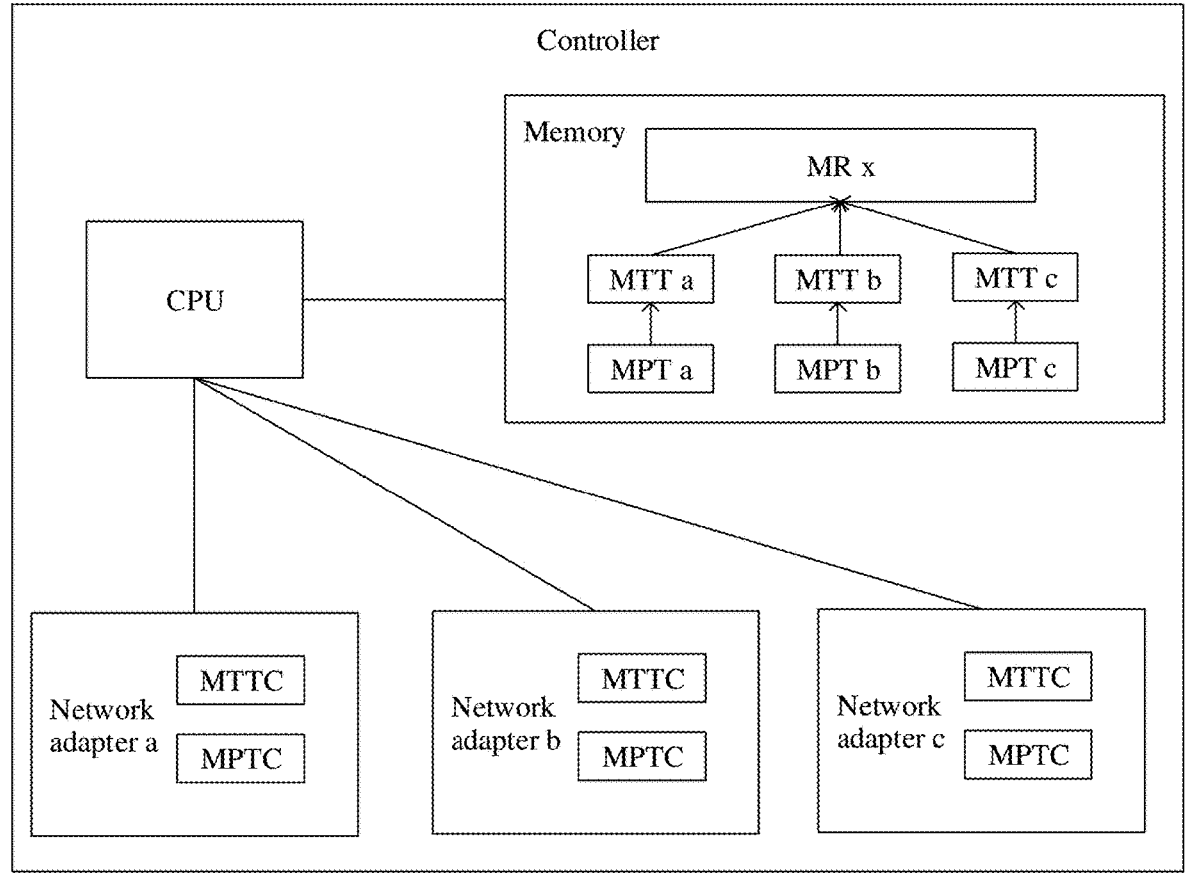
FIG. 6 is a schematic diagram of a structure of a controller.

In a solution, referring to FIG. 6, to enable all of a network adapter a, a network adapter b, and a network adapter c to access an MR x, an MTT a corresponding to the network adapter a, an MTT b corresponding to the network adapter b, and an MTT c corresponding to the network adapter c are generated. In other words, when the plurality of network adapters share the MR x, an MTT is independently created for each of the plurality of network adapters. A quantity of MTTs corresponding to MR x is in proportional to a quantity of corresponding network adapters. As described above, the MTT includes a plurality of translation entries. Each translation entry may record a physical address corresponding to a virtual address, and need to occupy 8-byte space. For a system with a 4 KB page size, a 4 KB MTT is consumed each time an MR of 2 MB bytes is registered. Therefore, in the solution shown in FIG. 6, the memory of the controller has large storage resource overheads.

In addition, in the solution shown in FIG. 6, a process of registering and deregistering an MR is time-consuming, and time required is in proportional to a quantity of network adapters. Specifically, it takes a long processing time to separately register the MR for each network adapter. In addition, when the MR is deregistered from a network adapter, releasing a corresponding MTT also takes time. Generally, a process of registering and deregistering one MR takes more than dozens of microseconds, and time required increases as a size of an MR space grows. Therefore, the solution shown in FIG. 6 is not friendly to dynamic memory management.

An embodiment of this disclosure provides a computer device and a memory registration solution. When one MR is registered with a plurality of network adapters, only one MTT may be created, to record a correspondence between a virtual address and a physical address of the MR. The MR is a shared MR of the plurality of network adapters. Different network adapters in the plurality of network adapters may access the shared MR by using the MTT. Therefore, there is no need to separately create an MTT for each network adapter to enable the different network adapters to access the shared MR. This reduces memory overheads.

The storage system and the memory registration solution provided in the embodiment of this disclosure are described by using examples in the following embodiments.

Figure 7:
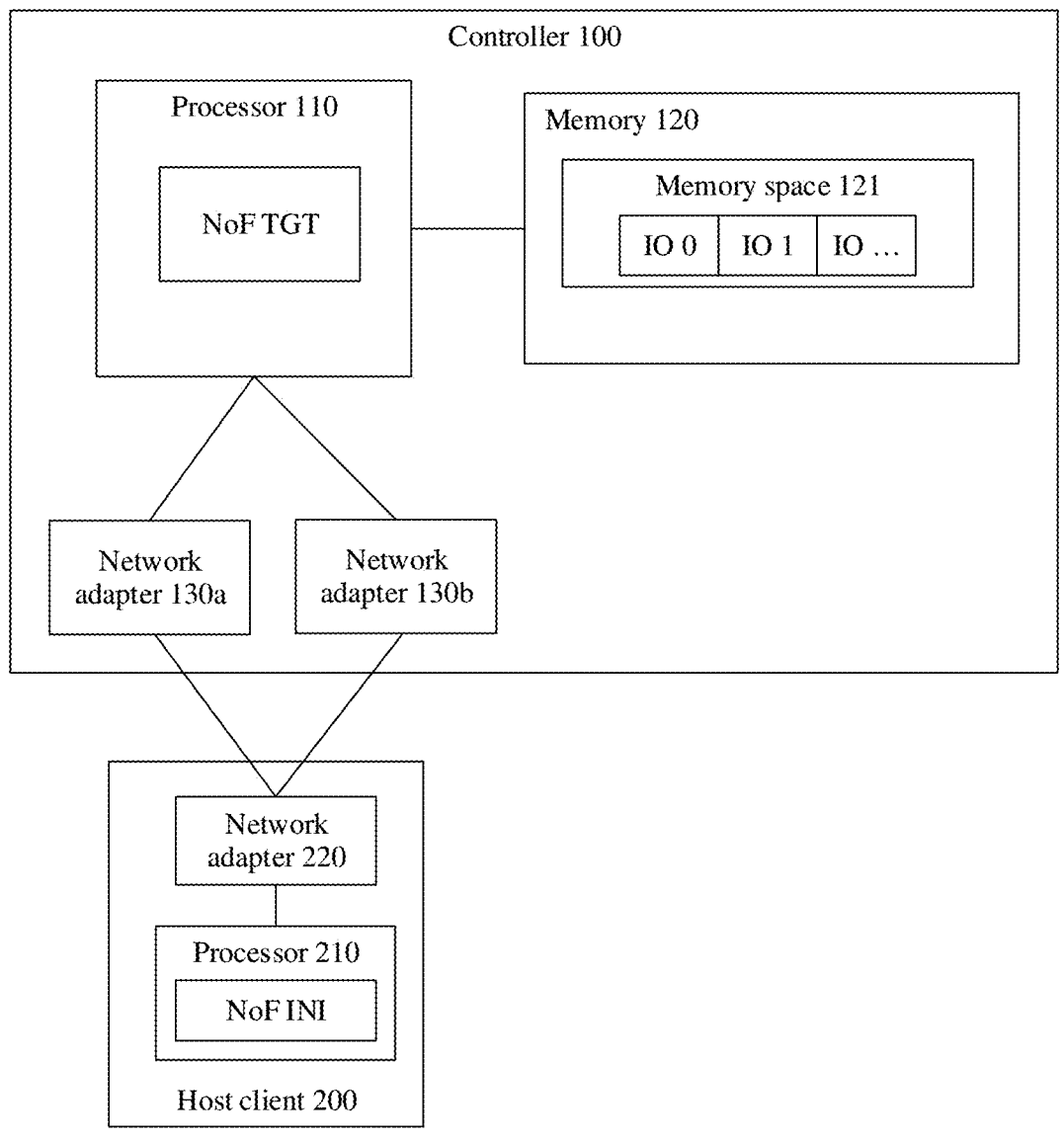
FIG. 7 is a schematic diagram of a structure of a storage system.

FIG. 7 shows a storage system. The storage system may include a controller 100 and a host client 200. The controller 100 may include a processor 110, a memory 120, a network adapter 130a, and a network adapter 130a. As shown in FIG. 7, each of the network adapter 130a, the network adapter 130b, and the memory 120 may be connected to the processor 110 to exchange information. In some embodiments, the network adapter 130a and the network adapter 130b each may be connected to the processor 110 through a PCIe interface, and the memory 120 may be connected to the processor 110 through a DDR interface.

The processor 110 may register one or more memory spaces in the memory 120 with the network adapter 130a and the network adapter 130b in a form of an MR, serving as a shared MR 121 of the network adapter 130a and the network adapter 130b.

The host client 200 may include a processor 210 and a network adapter 220. The controller 100 may establish a link to one or more host clients including the host client 200, to provide a storage service for the one or more host clients.

The host client 200 may include a processor 210 and a network adapter 220. The host client 200 may initiate a read/write operation under control of the processor 210. The controller 100 may perform related processing in response to the read/write operation. Specifically, when the host client 200 initiates a read operation (for example, an I/O read operation), the host client 200 may send a read request for the shared MR 121 to the controller 100 through the network adapter 220. The controller 100 may send, in response to the read request, data stored in the shared MR 121 to the host client 200 through the network adapter 130a and/or the network adapter 130b. When the host client 200 initiates a write operation, the controller 100 may receive data from the host client 200 through the network adapter 130a and/or the network adapter 130b, and write the data into the shared MR 121.

In some embodiments, the controller 100 is used as a head of a storage array system, and may be used as a target (TGT) in a NoF protocol. In other words, the controller 100 may implement a function of the TGT in the NoF protocol. Specifically, the processor 110 may perform a TGT function defined in the NoF protocol, so that the controller 100 can implement the TGT function in the NoF protocol. The host client 200 may be used as an initiator (INI) in the NoF protocol to exchange information with the controller 100. Specifically, the processor 210 may execute an INI function defined in the NoF protocol, so that the host client can implement the function in the NoF protocol.

In addition, in the following descriptions, the network adapter 130a, the network adapter 130b, and the network adapter 220 may be referred to as network adapter for short when they are not specially distinguished. The processor 110 and the processor 210 may be referred to as processor for short when they are not specially distinguished.

In some embodiments, the network adapter may be an RNIC network adapter.

Figure 8:
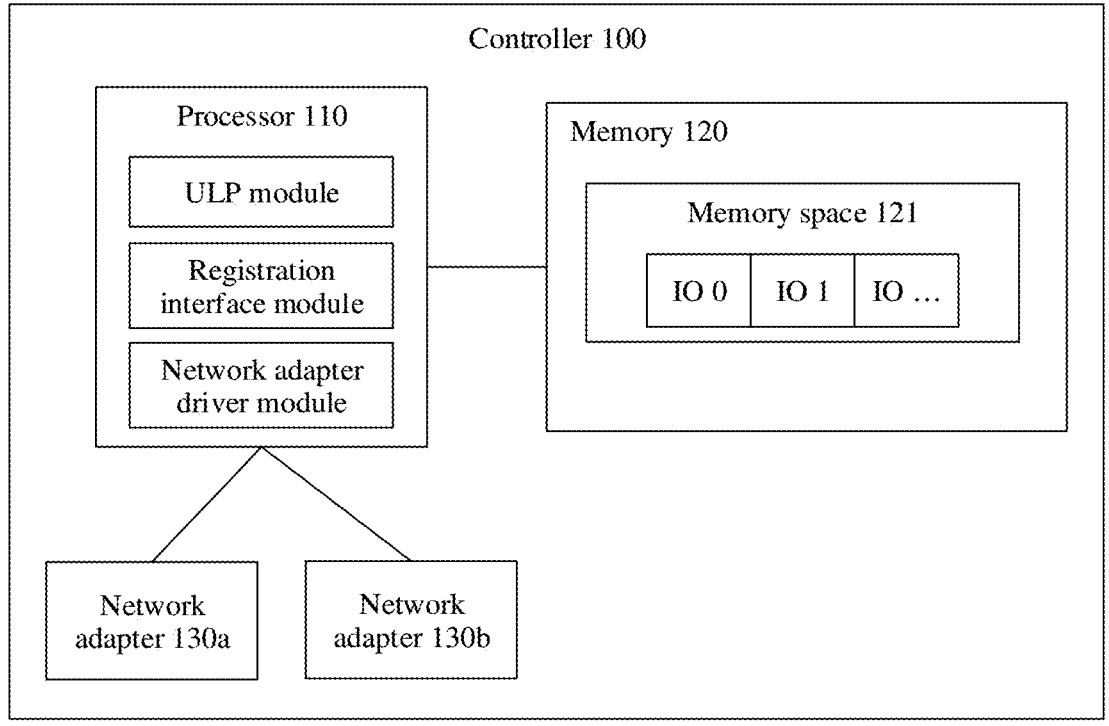
FIG. 8 is a schematic diagram of a structure of a controller.

FIG. 8 shows software modules possibly related in this embodiment of this disclosure. The processor 110 may include an upper layer protocol (ULP) module, a registration interface module, and a network adapter driver module.

The upper layer protocol module may execute or implement a function defined or specified by an upper layer protocol. The upper layer protocol is relative to a lower layer protocol. For example, in seven layers in a network, namely, an application layer, a presentation layer, a session layer, a transport layer, a network layer, a data link layer, and a physical layer from top to bottom, the application layer, presentation layer, session layer, or the like is an upper layer protocol.

In some embodiments, the upper layer protocol module may be a protocol stack of a target in the NoF protocol.

The registration interface module has an MR registration function. Specifically, the registration interface module may be invoked by the upper layer protocol module to register the one or more memory spaces in the memory 120 as an MR of the one or more network adapters. After the memory space is registered as the MR of the network adapter, the memory space may be referred to as a memory region. For example, the upper layer protocol module may specify a memory space and a network adapter, so that the registration interface module performs an MR registration function. In some embodiments, the registration interface module may be an OpenFabrics enterprise distribution (OFED) interface.

The network adapter driver module has a network adapter management function, and is configured to manage a network adapter of the controller 100, for example, the network adapter 130a and the network adapter 130b. The network adapter driver module may manage an MTT and an MPT of the network adapter, for example, may create and update an MTT, create an MPT, and update an MPT.

Functions of the upper layer protocol module, the registration interface module, and the network adapter driver module are described in detail below with reference to the memory registration process. Details are not described herein.

In some embodiments, the upper layer protocol module, the registration interface module, or the network adapter driver module may be a software module or a virtual function module, and a function of the software module or the virtual function module may be implemented by the processor 110 by executing a computer instruction. In some embodiments, the upper layer protocol module, the registration interface module, or the network adapter driver module may be an entity functional module. An implementation form or a product form of the upper layer protocol module, the registration interface module, or the network adapter driver module is not specifically limited in this embodiment of this disclosure.

A process of registering a shared memory is described with an example of registration of a shared memory of the network adapter 130a and the network adapter 130b with reference to the accompanying drawings.

A storage space of the memory 130 may be divided into one or more memory spaces, and the one or more memory spaces may include a memory space 121.

When the memory space 121 has not been registered as an MR, the controller 100 may first register the memory space 121 as an MR of the network adapter 130a. For example, the ULP module may invoke the registration interface module and the network adapter driver module to register the memory space 121 as the MR of the network adapter 130a. After the memory space 121 is registered as the MR of the network adapter, the memory space 121 may also be referred to as a memory region 121.

In a process of registering the memory space 121 as the MR of the network adapter 130a, the controller 100 may create an MTT 1211. The MTT 1211 records a correspondence between a virtual address and a physical address of the memory space 121. In some embodiments, before creating the MTT 1211, the controller 100 may query whether an MTT corresponding to the memory space 121 already exists, or in other words, the memory space 121 has been registered as an MR. For example, the memory 120 may be queried for an MTT including the physical address and/or virtual address of the memory space 121. If the MTT including the physical address and/or virtual address of the memory space 121 already exists, it may be determined that the MTT corresponding to the memory space 121 already exists. If the MTT including the physical address and/or virtual address of the memory space 121 does not exist, it may be determined that the MTT corresponding to the memory space 121 has not been created. As described above, it is assumed that before the memory space is registered as the MR of the network adapter 130a, the memory space has not been registered as an MR. In other words, the MTT corresponding to the memory space 121 has not been created. In this case, the MTT corresponding to the memory space 121, namely, the MTT 1211, may be created.

In some embodiments, the operation of creating the MTT 1211 may be specifically performed by the network adapter driver module.

The controller 100 may further generate an MKEY used to identify the memory space 121.

In some embodiments, the controller 100 may select an MKEY A1 from MKEY resources of the network adapter 130a, to identify the memory space 121. In other words, the MKEY A1 in the MKEY resources of the network adapter 130a is used as the MKEY used to identify the memory space 121. In this way, the MKEY A1 used to identify the memory space 121 is generated. For ease of description, the MKEY used to identify a memory space may be referred to as an MKEY of the memory space for short. The MKEY used as the MKEY used to identify a memory space may be referred to as a used MKEY. For example, the MKEY A1 is an MKEY of the memory space 121. After the MKEY A1 is used as the MKEY of the memory space, the MKEY A is a used MKEY.

The MKEY resources of the network adapter may be understood as a resource pool, and may include a plurality of MKEYs that can be used to identify a memory space but have not been used to identify a memory space. For ease of description, an MKEY that can be used to identify a memory space but has not been used to identify a memory space may be referred to as an unused MKEY for short. When an MKEY used to identify a memory space (for example, the memory space 121) needs to be generated, one MKEY may be selected from the plurality of unused MKEYs as the MKEY of the memory space. For example, the MKEY A1 is used as the MKEY of the memory space 121.

In this embodiment of this disclosure, both the network adapter 130a and the network adapter 130b have MKEY resources. The MKEY resources of the network adapter 130a may be classified into a shared resource and an exclusive resource, and the MKEY resources of the network adapter 130b may be classified into a shared resource and an exclusive resource. The exclusive resource of the network adapter 130a and the exclusive resource of the network adapter 130b are independent of each other and do not affect each other. The shared resource of the network adapter 130a is the same as the shared resource of the network adapter 130b. The shared resource is an MKEY resource shared by the network adapter 130a and the network adapter 130b, and may be jointly managed. Specifically, after an MKEY in the shared resource of the network adapter 130a is used as an MKEY of a memory space, the MKEY in the shared resource of the network adapter 130b is also used as an MKEY of the memory space and is no longer used as an MKEY of another memory space. The MKEY in the shared resource may also be referred to as a shared identifier. The shared identifier may be used to identify or represent an MR registered with different network adapters. For example, an MKEY in the exclusive resource may also be referred to as an exclusive identifier or an independent identifier, and may represent an MR that is registered only with a corresponding network adapter.

In an example, it is assumed that the MKEY resources of the network adapter 130a include 100 integers between 1 and 100, where each integer may be one MKEY; and the MKEY resources of the network adapter 130b include 100 integers between 1 and 100, where each integer is one MKEY. In the MKEY resources of the network adapter 130a, 20 integers between 1 and 20 may be used as shared resources of the network adapter 130a, and 80 integers between 21 and 100 may be used as exclusive resources of the network adapter 130a. In the MKEY resources of the network adapter 130b, 20 integers between 1 and 20 may be used as shared resources of the network adapter 130b, and 80 integers between 21 and 100 may be used as exclusive resources of the network adapter 130b. When an integer between 1 and 20 in the MKEY resources of the network adapter 130a, for example, 15, is used as an MKEY of a memory space, 15 in the MKEY resources of the network adapter 130b is also used as the MKEY of the memory space. The exclusive resources of the network adapter 130a and the exclusive resources of the network adapter 130b are independent of each other. For example, a value 30 in the exclusive resources of the network adapter 130a may be used as an MKEY of a memory space, and a value 30 in the exclusive resources of the network adapter 130b may be used as an MKEY of another memory space.

The MKEY A1 is selected from the shared resources of the network adapter 130a. Therefore, for the network adapter 130a and the network adapter 130a, the MKEY of the memory space 121 is the MKEY A1.

In some embodiments, the operation of generating the MKEY used to identify the memory space 121 may be specifically performed by the network adapter driver module.

After the MTT 1211 and the MKEY of the memory space 121 are generated, an entry 12111 may be added to an MPT (that is, the MPT 131a) of the network adapter 130a, and access permission (for example, read-only permission or read/write permission) of the network adapter 130a for the memory space 121, the MKEY (namely, the MKEY A1) of the memory space 121, and a memory address of the MTT 1211 are recorded in the entry 12111. In this way, when the network adapter 130a needs to access the MR identified by the MKEY A1, the network adapter 130a may determine, by searching the entry 12111, the access permission of the network adapter 130a for the memory region (namely, the memory space 121) identified by the MKEY A1. When the network adapter 130a has corresponding access permission (for example, read-only permission or read/write permission) for the memory space 121, the network adapter 130a may read the MTT 1211 based on the memory address of the MTT 1211 recorded in the entry 12111, to obtain the physical address of the memory space 121, and then may further obtain the memory space 121 based on the physical address.

In an example, a prototype of a registration interface of a shared MR used to register the memory space 121 with the network adapter 130a may be struct mr*smr_reg (struct pd*, va, length, access), where pd represents a pointer of a protection domain data structure, and each network adapter device corresponds to one or more protection domain data structures; va represents a start virtual address of the shared MR; length represents a length of the shared MR; and access represents access permission for the shared MR, for example, read-only permission or read/write permission. A return value is a pointer that points to a data structure that describes the shared MR.

The controller 100 may further register the memory space 121 with the network adapter 130b, so that the memory space 121 becomes a shared MR of the network adapter 130a and the network adapter 130b. In some embodiments, the ULP module may invoke an OFED interface module to fork (fork) the memory space 121 from another network adapter, for example, the network adapter 130b, other than the network adapter 130a, so that the memory space 121 becomes a shared MR of the network adapter 130a and the another network adapter. In an example, a prototype of a fork interface of a shared MR used to fork the memory space 121 is struct mr*smr_fork (struct pd*, struct*smr), where pd herein has the same meaning as pd in the registration interface, smr herein has the same meaning as a return value in the registration interface, and a return value herein has the same meaning as a return value in the registration interface.

In some embodiments, in a process in which the controller 100 registers the memory space 121 with the network adapter 130b, the controller 100 may query whether an MTT corresponding to the memory space 121 already exists, or in other words, the memory space 121 has been registered as an MR. When the MTT 1211 has been created, the MTT corresponding to the memory space 121, namely, the MTT 1211 may be found. In this way, in a process of registering the memory space 121 with the network adapter 130b, the controller 100 may no longer create an MTT corresponding to the memory space 121, but directly use the MTT 1211 to perform registration or continue a registration process.

The controller 100 may add an entry 12112 to an MPT (namely, an MPT 131b) of the network adapter 130b, and record access permission (for example, read-only permission or read/write permission) of the network adapter 130b for the memory space 121, the MKEY (namely, the MKEY A1) of the memory space 121, and the memory address of the MTT 1211 in the entry 12112. In this way, the memory space 121 is registered with the network adapter 130b.

When the network adapter 130b needs to access the MR identified by the MKEY A1, the network adapter 130b may determine, by searching the entry 12112, the access permission of the network adapter 130b for the memory region (namely, the memory space 121) identified by the MKEY A1. When the network adapter 130b has corresponding access permission (for example, read-only permission or read/write permission) for the memory space 121, the network adapter 130b may read the MTT 1211 based on the memory address of the MTT 1211 recorded in the entry 12112, to obtain the physical address of the memory space 121, and then may further obtain the memory space 121 based on the physical address.

In some embodiments, the host client 200 may send an access request to the controller 100. The controller 100 may obtain the virtual address of the memory space 121 and the MKEY of the memory space 121 based on the access request. The controller 100 may receive the access request through the network adapter 130a or the network adapter 130b. The network adapter 130a or the network adapter 130b may determine, from the MPT of the network adapter 130a or the MPT of the network adapter 130b based on the MKEY of the memory space 121, a memory address of the MTT corresponding to the memory space 121 (namely, the memory address of the MTT 1211). The network adapter 130a or the network adapter 130b may access the MTT 1211 based on the memory address, and determine the physical address of the memory space 121 based on the virtual address of the memory space 121. In this way, the network adapter 130a or the network adapter 130b can access the memory space 121 based on the physical address.

According to the foregoing solution, when only one MTT (namely, the MTT 1211) needs to be created, the memory space 121 can be registered with the network adapter 130a and the network adapter 130b, so that the memory space 121 becomes the shared MR of the network adapter 130a and the network adapter 130b. This saves storage resources.

The foregoing describes the solution of registering a shared MR of a plurality of network adapters by using the example of registration of the shared MR of the network adapter 130a and the network adapter 130b. When a shared MR of three or more network adapters needs to be registered, registration may be performed with reference to the foregoing solution. For example, MKEY resources of each of the three or more network adapters may be classified into a shared resource and an independent resource, where a shared resource of different network adapters is shared by the different network adapters, and an MKEY may be selected from the shared resource to identify a shared MR. For details, refer to the foregoing descriptions of the shared resource. Details are not described herein again.

This embodiment of this disclosure may further implement fast deregistration of a shared MR. The following describes the fast deregistration solution of a shared MR.

In some embodiments of this disclosure, when creating the MTT 1211, the controller 100 may further create a counter (CNT) 1212. An initial value of a count of the counter 1212 is 0. When a memory address of the MR 121 or the memory space 121 is recorded in the MPT 131a, the count of the counter 1212 may be incremented by 1. When the controller 100 records the memory address of the MR 121 or the memory space 121 in the MPT 131b, the count of the counter 1212 may be incremented by 1 again. The count of the counter 1212 records a quantity of network adapters corresponding to the memory space 121.

The controller 100 may enable the network adapter to deregister the MR. That the network adapter deregisters the MR specifically refers to that the MR is no longer associated with the network adapter, or in other words, after the MR is deregistered, the MR is no longer an MR of the network adapter. In some embodiments, the ULR module may invoke a registration interface module and the network adapter driver module, to enable the network adapter to deregister the MR.

In some embodiments, the controller 100 may enable the network adapter 130a to deregister the shared MR 121.

Specifically, the controller 100 may delete the entry 12111 from the MPT 131a, that is, delete the memory address of the MR 121, the MKEY of the MR 121, and the like from the MPT 131a, so that the shared MR 121 is no longer associated with the network adapter 130a. When or after the entry 12111 is deleted from the MPT 131a, the controller 100 may decrement the count of the counter 1212 by 1. The controller 100 may enable the network adapter 130b to deregister the shared MR 121. Specifically, the controller 100 may delete the entry 12112 from the MPT 131b, that is, delete the memory address of the MR 121, the MKEY of the MR 121, and the like from the MPT 131b, so that the shared MR 121 is no longer associated with the network adapter 130b. When or after the entry 12112 is deleted from MPT 131b, the controller 100 may decrement the count of the counter 1212 by 1 again. In this way, the count of the counter 1212 returns to the initial value, that is, 0. When the count of the counter 1212 is 0, the controller 100 may delete the MTT 1211 to release a memory space occupied by the MTT 1211.

In an example, a prototype of a deregistration interface of a shared MR used by the network adapter to deregister the shared MR may be int smr_dereg (struct pd*, mkey), where a meaning of pd is the same as that of pd in the registration interface, and mkey represents an index of an MPT entry.

In some embodiments, the controller 100 may enable the network adapter 130b to deregister the shared MR 121. Specifically, the controller 100 may delete the entry 12112 from the MPT 131b, so that the shared MR 121 is no longer associated with the network adapter 130b. When or after the entry 12112 is deleted from the MPT 131b, the controller 100 may decrement the count of the counter 1212 by 1. The controller 100 may enable the network adapter 130a to deregister the shared MR 121. Specifically, the controller 100 may delete the entry 12111 from the MPT 131a, so that the shared MR 121 is no longer associated with the network adapter 130a. When or after the entry 12111 is deleted from the MPT 131a, the controller 100 may decrement the count of the counter 1212 by 1 again. In this way, the count of the counter 1212 returns to the initial value, that is, 0. When the count of the counter 1212 is 0, the controller 100 may delete the MTT 1211 to release a memory space occupied by the MTT 1211. In addition, the controller 100 may release an MKEY resource occupied by the memory space 121, that is, restore the MKEY A1 to an unused MKEY.

In the solution of deregistering the shared MR in this embodiment of this disclosure, the shared MR can be deregistered, so that the memory space occupied by the MTT can be released as soon as possible, thereby reducing storage resource overheads.

A specific implementation of the memory registration solution provided in embodiments of this disclosure is described with reference to FIG. 9 and FIG. 10 in the following embodiment.

Figure 9:
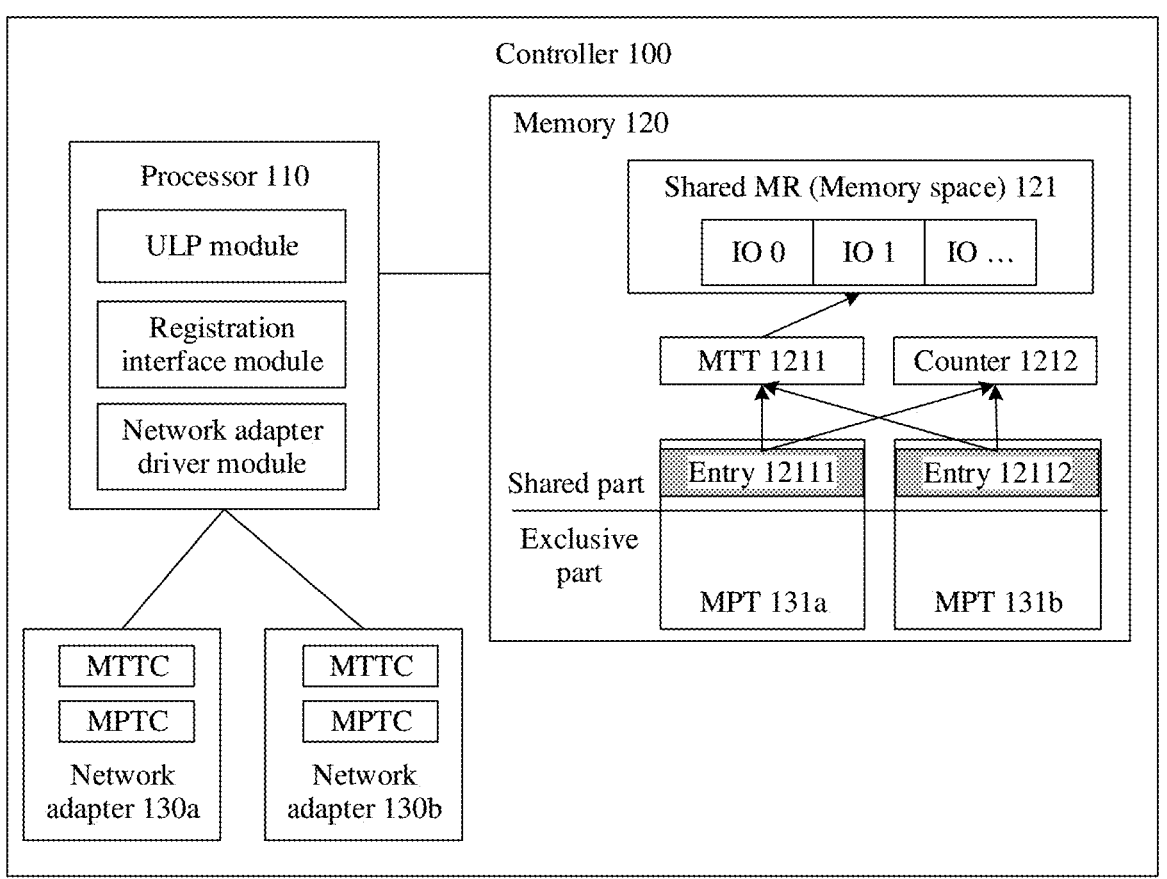
FIG. 9 is a schematic diagram of a structure of a controller.
Figure 10:
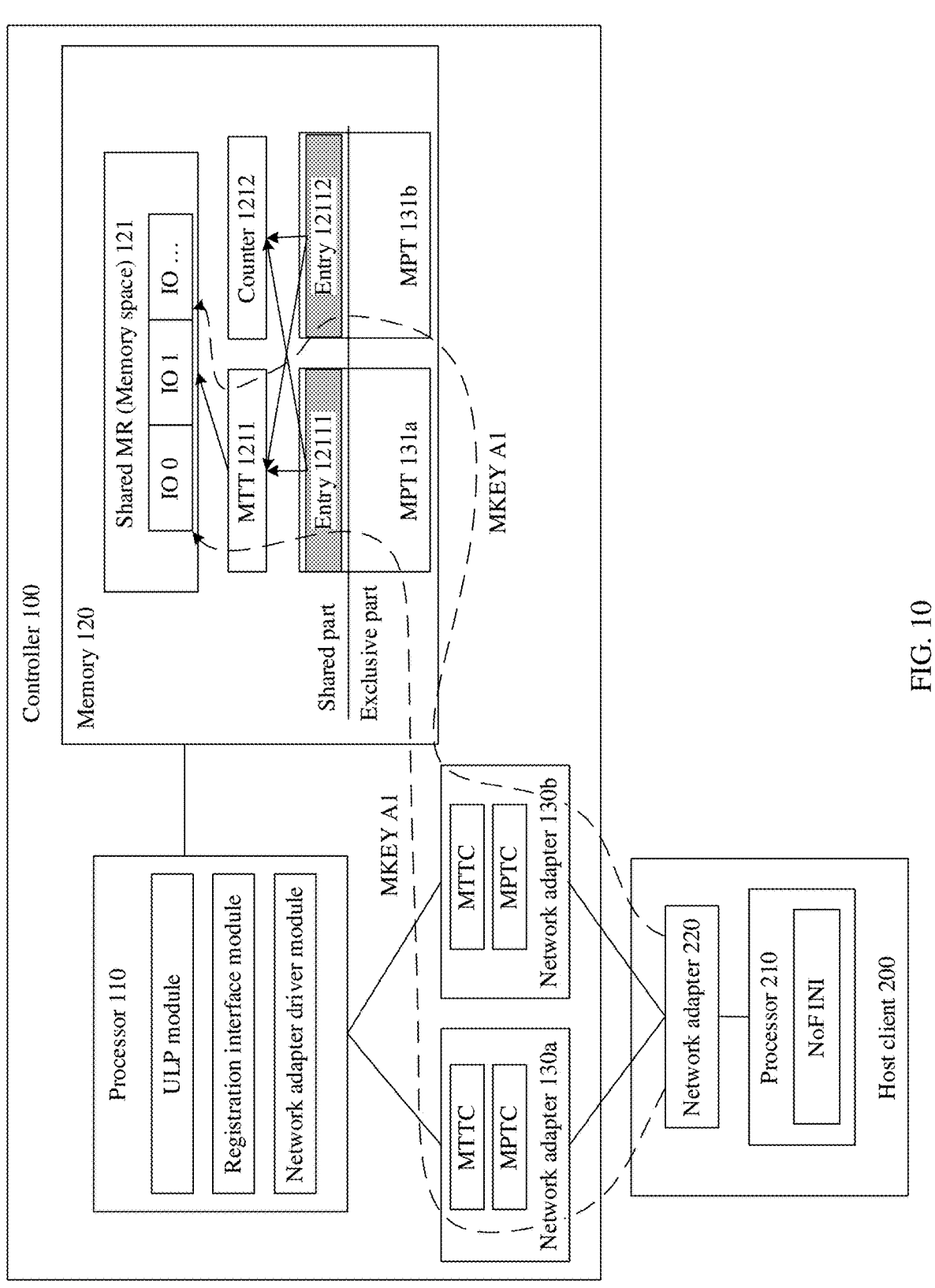
FIG. 10 is a schematic diagram of a structure of a storage system.

Referring to FIG. 9 and FIG. 10, both the network adapter 130a and the network adapter 130b are connected to the processor 110 (for example, through the PCIe interface), the memory 120 is also connected to a CPU, and a shared MR is allocated to the two network adapters for use. There is a shared MTT in the memory, and the shared MTT is used to translate virtual addresses sent by the network adapter 130a and the network adapter 130b into physical addresses, so as to implement read/write access to the shared MR. A reference counter MTT_CNT (namely, the counter 1212) is further set in the memory with an initial value of 0, and is created and managed by the network adapter driver module. Each time the shared MR is registered with a new network adapter, a count of the counter is incremented by 1. When the shared MR is deregistered from a network adapter, the count of the counter is decremented by 1. Once the counter is decremented to 0, it indicates that no network adapter device needs to use the shared MR, and a memory space occupied by the MTT and a memory space occupied by the MTT_CNT counter are released.

The network adapter driver module may classify MPT resources into two parts, that is, a shared part and an exclusive part based on a requirement specification of the ULP module, where the MPT resources have been reserved before registration is performed. The shared part is used to register the shared MR (that is, used to record an MKEY, an MTT address, access permission, and the like of the shared MR), and the exclusive part is used to register a non-shared MR (that is, used to record an MKEY, an MTT address, access permission, and the like of the non-shared MR). The MKEY of the MR may be used as an index of an MPT entry.

A procedure of registering a shared MR of a plurality of network adapters may be as follows:

1. The ULP module invokes the registration interface module to register a shared MR with any one of the plurality of network adapters. Then, the network adapter driver module selects for allocation an available MKEY from a shared resource of MKEY resources of the network adapter, generates an MPT entry, an MTT, and an MTT reference counter of a corresponding network adapter device, and returns information about the shared MR.
2. The ULP module invokes a fork interface to register the shared MR with another network adapter. The network adapter driver module generates an MPT entry for the shared MR based on specified shared MR information, where the MPT entry points to a shared MTT table, and increments the MTT reference counter by 1. This step is performed once for each network adapter that needs to access the shared MR.

Referring to FIG. 10, when the host client performs an I/O read/write operation on the shared MR through different paths, different network adapters all use the same MKEY A1 and access the shared memory 121 based on shared MTT 1211.

When the network adapter does not need to access the shared MR or the network adapter is faulty, the MR can be deregistered. A procedure is as follows:

The ULP module invokes the deregistration interface to deregister the shared MR from a network adapter. Then, the network adapter driver module releases a corresponding MPT entry, and decrements the MTT counter by 1. When the MTT counter is decremented to 0, the MTT entry is released. This step is performed once for each network adapter that needs to deregister the shared MR.

The solution shown in FIG. 9 and FIG. 10 can reduce memory overheads. Specifically, after the shared MR is registered, N network adapters may use only one MTT table. Compared with the solution shown in FIG. 6, (N−1) memory spaces are saved. N is an integer greater than 1.

The solution shown in FIG. 9 and FIG. 10 reduce time spent on MR registration/deregistration. Specifically, when a shared MR is registered/deregistered, the MTT table needs to be applied for, initialized, and released only once. Compared with the solution shown in FIG. 6, (N−1) MTT table operations are saved, where N is a quantity of RNIC network adapters.

The foregoing describes an example memory registration solution provided in embodiments of this disclosure. Based on a part or all of content described above and a solution shown in FIG. 11, another memory registration solution provided in an embodiment of this disclosure is described below by using an example.

Figure 11:
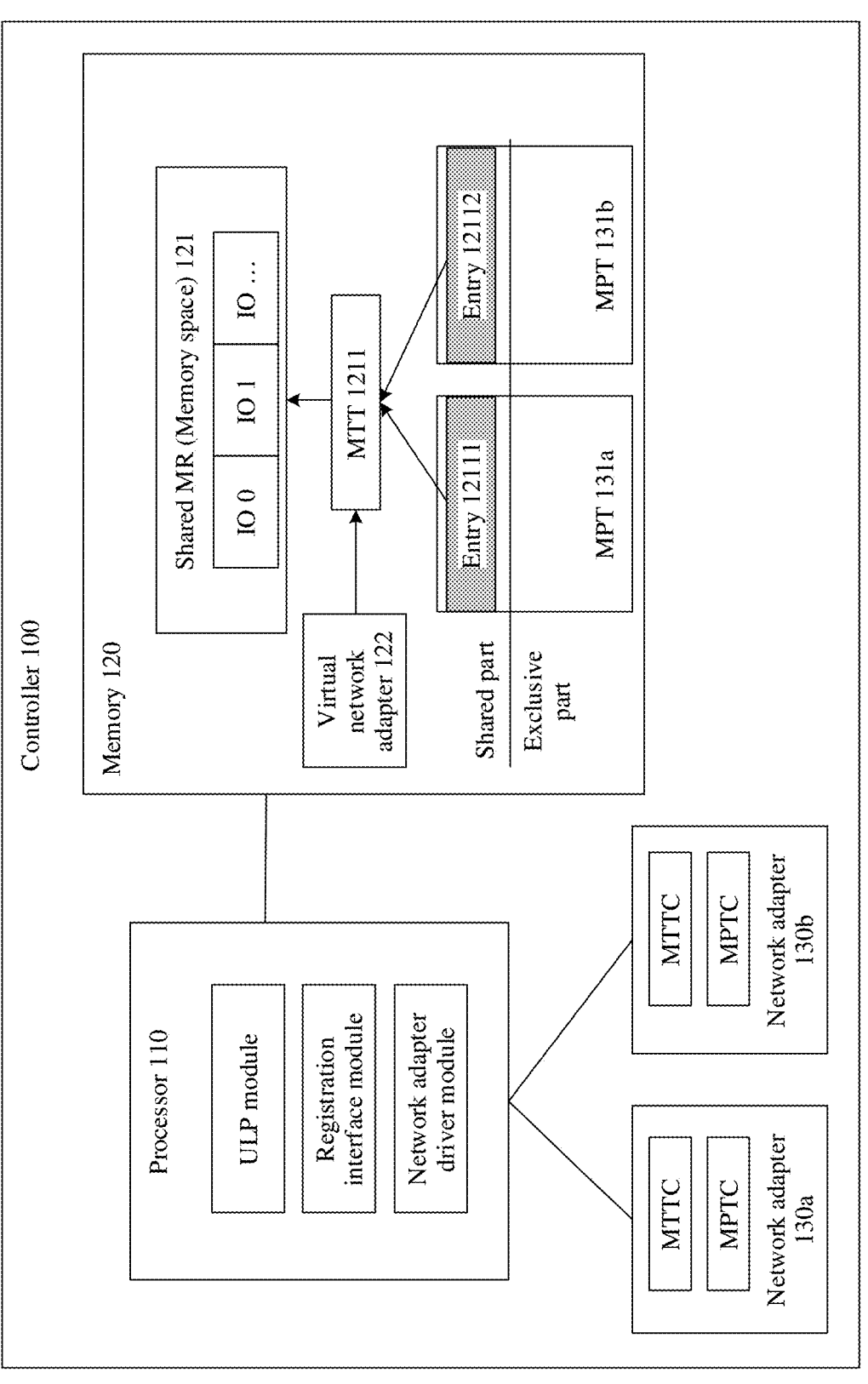
FIG. 11 is a schematic diagram of a structure of a controller.

Refer to FIG. 11. An embodiment of this disclosure provides another memory registration solution. The solution may be applied to the system shown in FIG. 7. The solution may be specifically executed by the controller 100.

A virtual network adapter device, namely, a virtual PCIe device in the FIG. 11, is virtualized in the system (which is a conventional technology, similar to creating a virtual device by using QEMU software), and the virtual network adapter device is never faulty.

Refer to FIG. 1i. A virtual network adapter 122 may be created, and the virtual network adapter is never faulty. In some embodiments, the virtual network adapter may be a virtual PCIe device. For example, a virtual network adapter may be created by using a virtual operating system emulator (QEMU). For a specific manner of creating a virtual network adapter, refer to the conventional technology. Details are not described herein again. In addition, relative to the virtual network adapter, the network adapter 130a and the network adapter 130b are physical network adapters.

The virtual network adapter has preset MKEY resources, which include at least one unused MKEY.

When registering a shared MR of the network adapter 130a and the network adapter 130b, the controller 100 may first register the memory space 121 as an MR of the virtual network adapter. In a process of registering the memory space 121 as the MR of the virtual network adapter, an MTT 1211 may be created. The MTT 1211 is configured to record a correspondence between a virtual address and a physical address of the memory space 121. Alternatively, an MKEY may be selected from at least one unused MKEY included in the MKEY resources of the virtual network adapter, and is used as an MKEY of the memory space 121, namely, an MKEY A1.

The controller 100 may fork the MKEY A1 and the MTT 1211 to physical network adapters such as the network adapter 130a and the network adapter 130b, to register the memory space 121 as a shared MR of the network adapter 130a and the network adapter 130b. Specifically, the controller 100 may add an entry 12111 to an MPT (namely, an MPT 131a) of the network adapter 130a, and record access permission (for example, read-only permission or read/write permission) of the network adapter 130a for the memory space 121, the MKEY (namely, the MKEY A1) of the memory space 121, and a memory address of the MTT 1211 in the entry 12111. In this way, the memory space 121 is registered with the network adapter 130a. The controller 100 may add an entry 12112 to an MPT (namely, an MPT 131b) of the network adapter 130b, and record access permission (for example, read-only permission or read/write permission) of the network adapter 130b for the memory space 121, the MKEY (namely, the MKEY A1) of the memory space 121, and the memory address of the MTT 1211 in the entry 12112. In this way, the memory space 121 is registered with the network adapter 130b.

During deregistration of the shared MR, the shared MR of the physical network adapters is first deregistered, that is, the shared MR is deregistered from the network adapter 130a and the network adapter 130b. Then, the MKEY resources and a memory space occupied by the MTT are released based on the virtual network adapter 122. For the MR deregistration and the release of the MKEY resources and the memory space occupied by the MTT, refer to the foregoing descriptions of the embodiment shown in FIG. 9 and FIG. 10. Details are not described herein again.

Still refer to FIG. 11. The network adapter driver module may classify MPT resources of the network adapter into two parts, that is, a shared part and an exclusive part based on a requirement specification of the ULP module. The shared part is used to register the shared MR (that is, used to record an MKEY, an MTT address, access permission, and the like of the shared MR), and the exclusive part is used to register a non-shared MR (that is, used to record an MKEY, an MTT address, access permission, and the like of the non-shared MR).

A procedure of registering a shared MR of a plurality of network adapters may be as follows:

1. The ULP module invokes a registration interface module to register the shared MR with the virtual network adapter 122. The virtual network adapter 122 allocates an available MKEY from MKEY resources of the virtual network adapter 122, generates an MPT entry and an MTT of the virtual network adapter 122, and returns information about the shared MR.
2. The ULP module invokes a fork interface to register the shared MR with the physical network adapters. The physical network adapters generate an MPT entry based on specified shared MR information. The MPT entry points to a shared MTT table. This step is performed once for each physical network adapter that needs to access the shared MR.

When the physical network adapter does not need to access the shared MR or the physical network adapter is faulty, the MR can be deregistered. A procedure is as follows:

1. The ULP module invokes a deregistration interface to deregister the shared MR from a network adapter. Then, the network adapter releases a corresponding MPT entry. This step is performed once for each network adapter that needs to deregister the shared MR.
2. If all physical network adapter devices have completed deregistration, the ULP module invokes the deregistration interface to deregister the shared MR from the virtual network adapter 122. Then, the virtual network adapter 122 releases a corresponding MPT entry and the MTT 1211.

According to the foregoing solution, when only one MTT (namely, the MTT 1211) needs to be created, the memory space 121 can be registered with the network adapter 130a and the network adapter 130b, so that the memory space 121 becomes the shared MR of the network adapter 130a and the network adapter 130b. This saves storage resources.

A computer device provided in an embodiment of this disclosure is described below based on the memory registration solution described above. It may be understood that a function of the computer device is another expression of the memory registration solution described above, and the two are combined. Functions of the computer device are proposed based on the foregoing described memory registration solution. For some or all of the functions of the computer device, refer to the foregoing descriptions of the memory registration solution.

An embodiment of this disclosure provides a computer device, including a processor, a memory connected to the processor, where the memory includes a first memory region, and a plurality of network adapters connected to the processor. The processor is configured to: when registering the first memory region with the plurality of network adapters, record a first memory address in a first memory address translation table MTT into a memory protection table MPT of each network adapter in the plurality of network adapters, so that each of the network adapters is capable of accessing the first memory region by using the first memory address translation table. The first memory address translation table is used to indicate a correspondence between a virtual address of the first memory region and a physical address of the first memory region.

The computer device may be the controller 100 described above. The processor in the computer device may be the processor 110. The memory in the computer device may be the memory 120. The first network adapter may be the network adapter 130a. The second network adapter may be the network adapter 130b.

In some embodiments, the plurality of network adapters include a first network adapter and a second network adapter. The processor is configured to: when registering the first memory region with the first network adapter, record the first memory address into a memory protection table of the first network adapter. The processor is configured to: when registering the first memory region with the second network adapter, record the first memory address into a memory protection table of the second network adapter.

In some embodiments, the plurality of network adapters include a first network adapter. The processor is configured to register the first memory region with the first network adapter, and then register the first memory region with a network adapter other than the first network adapter in the plurality of network adapters. The processor is configured to create the first memory address translation table when registering the first memory region with the first network adapter.

In some embodiments, the processor is configured to record the first memory address and a first identifier of the first memory region into the memory protection table of each network adapter in the plurality of network adapters, so that each of the network adapters is capable of reading the first memory address translation table by using the first identifier.

In an example of these embodiments, different network adapters in the plurality of network adapters share a first resource, the first resource includes at least one shared identifier, the shared identifier is used to represent a memory region registered with the plurality of network adapters, and the first identifier is determined from the first resource.

In an example of this example, a second resource is further configured for a first network adapter in the plurality of network adapters, the second resource includes at least one independent identifier, and the independent identifier is used to represent a memory region registered with only the first network adapter.

In some embodiments, the processor is configured to increment a count of a preset counter by 1 each time the first memory address is recorded into a memory protection table of one network adapter in the plurality of network adapters. The processor is further configured to decrement the count of the counter by 1 each time the first memory address is deleted from a memory protection table of one network adapter in the plurality of network adapters. The processor is configured to delete the first memory address translation table when the count of the counter returns to 0.

In some embodiments, the plurality of network adapters are physical network adapters; the processor is further configured to run a virtual network adapter; and the processor is configured to: before registering the first memory region with the plurality of network adapters, create the first memory address translation table based on the virtual network adapter.

In an example of these embodiments, the processor is further configured to delete the first memory address translation table when the first memory address has been deleted from memory protection tables of all the plurality of network adapters.

According to the computer device provided in this embodiment of this disclosure, a shared MR of a plurality of network adapters can be registered with only one MTT created. This reduces storage resource overheads.

A memory registration method provided in an embodiment of this disclosure is described below based on the memory registration solution described above. It may be understood that the method is another expression of the memory registration solution described above, and the two are combined. The method is proposed based on the foregoing described memory registration solution. For a part or all of the method, refer to the foregoing descriptions of the memory registration solution.

The memory registration method may be applied to a computer device. The computer device includes a processor; a memory connected to the processor, where the memory includes a first memory region; and a plurality of network adapters connected to the processor. The method includes the following steps: recording, by the processor when registering the first memory region with the plurality of network adapters, a first memory address in a first memory address translation table MTT into a memory protection table MPT of each network adapter in the plurality of network adapters, so that each of the network adapters is capable of accessing the first memory region by using the first memory address translation table. The first memory address translation table is used to indicate a correspondence between a virtual address of the first memory region and a physical address of the first memory region.

In some embodiments, the plurality of network adapters include a first network adapter and a second network adapter; and the recording, by the processor, a first memory address in a first memory address translation table MIT into a memory protection table MPT of each network adapter in the plurality of network adapters includes: when registering the first memory region with the first network adapter, recording the first memory address into a memory protection table of the first network adapter; and when registering the first memory region with the second network adapter, recording the first memory address into a memory protection table of the second network adapter.

In some embodiments, the plurality of network adapters include a first network adapter; and the registering, by the processor, the first memory region with the plurality of network adapters includes: registering, by the processor, the first memory region with the first network adapter, and then registering the first memory region with a network adapter other than the first network adapter in the plurality of network adapters. The processor creates the first memory address translation table when registering the first memory region with the first network adapter.

In some embodiments, the method further includes: recording, by the processor, the first memory address and a first identifier of the first memory region into the memory protection table of each network adapter in the plurality of network adapters, so that each of the network adapters is capable of reading the first memory address translation table by using the first identifier.

In an example of these embodiments, different network adapters in the plurality of network adapters share a first resource, the first resource includes at least one shared identifier, the shared identifier is used to represent a memory region registered with the plurality of network adapters, and the first identifier is determined from the first resource.

In an example of this example, a second resource is further configured for a first network adapter in the plurality of network adapters, the second resource includes at least one independent identifier, and the independent identifier is used to represent a memory region registered with only the first network adapter.

In some embodiments, the method further includes: incrementing, by the processor, a count of a preset counter by 1 each time the first memory address is recorded into a memory protection table of one network adapter in the plurality of network adapters; decrementing, by the processor, the count of the counter by 1 each time the first memory address is deleted from a memory protection table of one network adapter in the plurality of network adapters; and deleting, by the processor, the first memory address translation table when the count of the counter returns to 0.

In some embodiments, the plurality of network adapters are physical network adapters; the processor is further configured to run a virtual network adapter; and the method further includes: creating, by the processor before registering the first memory region with the plurality of network adapters, the first memory address translation table based on the virtual network adapter.

In an example of these embodiments, the method further includes: deleting, by the processor, the first memory address translation table when the first memory address has been deleted from memory protection tables of all the plurality of network adapters.

According to the memory registration method provided in this embodiment of this disclosure, a shared MR of a plurality of network adapters can be registered with only one MTT created. This reduces storage resource overheads.

An embodiment of this disclosure provides a computer storage medium. The computer storage medium stores a computer program. When the computer program is executed by a processor, a function of a controller 100 in the foregoing embodiments may be implemented.

An embodiment of this disclosure provides a computer program product. When the computer program product runs on one or more processors, a function of a controller 100 in the foregoing embodiments may be implemented.

An embodiment of this disclosure provides a processor, configured to perform the foregoing memory registration method.

It may be understood that, the processor in embodiments of this disclosure may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in embodiments of this disclosure may be implemented by hardware, or may be implemented by a processor executing software instructions. The software instructions may include a corresponding software module. The software module may be stored in a random access memory (RAM), a flash memory, a read-only memory (ROM), a programmable ROM (PROM), an erasable PROM (EPROM), an electrically EPROM (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC.

All or some of the foregoing embodiments may be implemented by software, hardware, firmware, or any combination thereof. When embodiments are implemented by software, all or some of the embodiments may be implemented in a form of a computer program product. The computer program product includes one or more computer instructions. When the computer program instructions are loaded and executed on the computer, the procedures or functions according to the embodiments of this disclosure are all or partially generated. The computer may be a general-purpose computer, a special-purpose computer, a computer network, or another programmable apparatus. The computer instructions may be stored in a computer-readable storage medium, or may be transmitted through the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

It may be understood that various numbers in embodiments of this disclosure are merely used for differentiation for ease of description, and are not intended to limit the scope of embodiments of this disclosure.

What is claimed is:

1. A device, comprising:
one or more processors;
a non-transitory memory connected to the one or more processors, wherein the non-transitory memory comprises a first memory region; and
a plurality of network adapters connected to the one or more processors, wherein the non-transitory memory stores a program to be executed by the one or more processors, the program including instructions to cause the device to perform operations including:
when registering the first memory region with the plurality of network adapters, recording a memory address of a shared memory translation table (MTT) into a corresponding memory protection table (MPT) of each network adapter of the plurality of network adapters, so that each network adapter of the plurality of network adapters is capable of accessing the first memory region through the memory address of the shared MTT, wherein the shared MTT indicates a correspondence between a virtual address of the first memory region and a physical address of the first memory region,
wherein the plurality of network adapters comprise a first network adapter and a second network adapter, and wherein the recording the memory address of the shared MTT into the corresponding MPT of each network adapter comprises:
registering the first memory region with the first network adapter, and recording the memory address of the shared MTT into a first MPT of the first network adapter; and registering the first memory region with the second network adapter, and recording the memory address of the shared MTT into a second MPT of the second network adapter, the second MPT being separate from the first MPT,
wherein the first network adapter accesses the first memory region through the memory address of the shared MTT recorded in the first MPT of the first network adapter, and
wherein the second network adapter accesses the first memory region through the memory address of the shared MTT recorded in the second MPT of the second network adapter.

2. The device according to claim 1,
the registering the first memory region with the plurality of network adapters comprising:
registering the first memory region with the first network adapter, and then registering the first memory region with a network adapter other than the first network adapter in the plurality of network adapters; and
creating the shared MTT when registering the first memory region with the first network adapter.

3. The device according to claim 1, the operations further comprising:
recording the memory address of the shared MTT and a first identifier of the first memory region into the corresponding MPT of each network adapter of the plurality of network adapters, so that each network adapter of the plurality of network adapters is capable of reading the shared MTT through the first identifier.

4. The device according to claim 3, wherein different network adapters in the plurality of network adapters share a first resource, the first resource comprises at least one shared identifier, the at least one shared identifier represents a memory region registered with the plurality of network adapters, and the first identifier is determined from the first resource.

5. The device according to claim 4, wherein a second resource is further configured for the first network adapter in the plurality of network adapters, the second resource comprises at least one independent identifier, and the at least one independent identifier represents an exclusive memory region registered with only the first network adapter.

6. The device according to claim 5, further comprising:
recording the at least one shared identifier and the at least one independent identifier into the first MPT.

7. The device according to claim 1, the operations further comprising:
incrementing a count of a preset counter by 1 each time the memory address of the shared MTT is recorded into an MPT of one network adapter in the plurality of network adapters;
decrementing the count of the preset counter by 1 each time the memory address of the shared MTT is deleted from the MPT of the one network adapter in the plurality of network adapters; and
deleting the shared MTT when the count of the preset counter returns to 0.

8. The device according to claim 1, wherein the plurality of network adapters are physical network adapters, the operations further comprising:
running a virtual network adapter; and
before the registering the first memory region with the plurality of network adapters, creating the shared MTT based on the virtual network adapter.

9. The device according to claim 1, the operations further comprising:

deleting the shared MTT when the memory address of the shared MTT has been deleted from the corresponding MPT of each network adapter of the plurality of network adapters.

10. The device according to claim 1, further comprising:

recording a first access permission of the first network adapter for the first memory region into the first MPT; and recording a second access permission of the second network adapter for the first memory region into the second MPT, the second access permission being separate from the first access permission.

11. A method, applied to a device, wherein the device comprises one or more processors; a memory connected to the one or more processors, wherein the memory comprises a first memory region; and a plurality of network adapters connected to the one or more processors; and the method comprises:

recording, by the one or more processors when registering the first memory region with the plurality of network adapters, a memory address of a shared memory translation table (MTT) into a corresponding memory protection table (MPT) of each network adapter of the plurality of network adapters, so that each network adapter of the plurality of network adapters is capable of accessing the first memory region through the memory address of the shared MTT, wherein the shared MTT indicates a correspondence between a virtual address of the first memory region and a physical address of the first memory region, wherein the plurality of network adapters comprise a first network adapter and a second network adapter, and wherein the recording the memory address of the shared MTT into the corresponding MPT of each network adapter comprises:

registering the first memory region with the first network adapter, and recording the memory address of the shared MTT into a first MPT of the first network adapter; and registering the first memory region with the second network adapter, and recording the memory address of the shared MTT into a second MPT of the second network adapter, the second MPT being separate from the first MPT, wherein the first network adapter accesses the first memory region through the memory address of the shared MTT recorded in the first MPT of the first network adapter, and wherein the second network adapter accesses the first memory region through the memory address of the shared MTT recorded in the second MPT of the second network adapter.

12. The method according to claim 11, wherein the registering, by the one or more processors, the first memory region with the plurality of network adapters comprises:

registering, by the one or more processors, the first memory region with the first network adapter, and then registering the first memory region with a network adapter other than the first network adapter in the plurality of network adapters, wherein the shared MTT is created, by the one or more processors, when registering the first memory region with the first network adapter.

13. The method according to claim 11, wherein the method further comprises:

recording, by the one or more processors, the memory address of the shared MTT and a first identifier of the first memory region into the corresponding MPT of each network adapter of the plurality of network adapters, so that each network adapter of the plurality of network adapters is capable of reading the shared MTT through the first identifier.

14. The method according to claim 13, wherein different network adapters in the plurality of network adapters share a first resource, the first resource comprises at least one shared identifier, the at least one shared identifier represents a memory region registered with the plurality of network adapters, and the first identifier is determined from the first resource.

15. The method according to claim 14, wherein a second resource is further configured for the first network adapter in the plurality of network adapters, the second resource comprises at least one independent identifier, and the at least one independent identifier represents an exclusive memory region registered with only the first network adapter.

16. The method according to claim 11, wherein the method further comprises:

incrementing, by the one or more processors, a count of a preset counter by 1 each time the memory address of the shared MTT is recorded into an MPT of one network adapter in the plurality of network adapters;

decrementing, by the one or more processors, the count of the preset counter by 1 each time the memory address of the shared MTT is deleted from the MPT of the one network adapter in the plurality of network adapters; and deleting, by the one or more processors, the shared MTT when the count of the preset counter returns to 0.

17. The method according to claim 11, wherein the plurality of network adapters are physical network adapters, the one or more processors are further configured to run a virtual network adapter; and the method further comprises:

creating, by the one or more processors before registering the first memory region with the plurality of network adapters, the shared MTT based on the virtual network adapter.

18. The method according to claim 11, wherein the method further comprises:

deleting, by the one or more processors, the shared MTT when the memory address of the shared MTT has been deleted from the corresponding MPT of each network adapter of the plurality of network adapters.

19. A non-transitory computer-readable storage medium, wherein the non-transitory computer-readable storage medium comprises computer instructions, and when the computer instructions are run on one or more processors, the one or more processors are enabled to perform operations comprising:

recording, by the one or more processors when registering a first memory region with a plurality of network adapters, a memory address of a shared memory translation table (MTT) into a corresponding memory protection table (MPT) of each network adapter of the plurality of network adapters, so that each network adapter of the plurality of network adapters is capable of accessing the first memory region through the memory address of the shared MTT, wherein the shared MTT indicates a correspondence between a virtual address of the first memory region and a physical address of the first memory region, wherein the plurality of network adapters comprise a first network adapter and a second network adapter, and wherein the recording the memory address of the shared MTT into the corresponding MPT of each network adapter comprises:

registering the first memory region with the first network adapter, and recording the memory address of the shared MTT into a first MPT of the first network adapter; and registering the first memory region with the second network adapter, and recording the memory address of the shared MTT into a second MPT of the second network adapter, the second MPT being separate from the first MPT, wherein the first network adapter accesses the first memory region through the memory address of the shared MTT recorded in the first MPT of the first network adapter, and wherein the second network adapter accesses the first memory region through the memory address of the shared MTT recorded in the second MPT of the second network adapter.

* * * * *